(12) United States Patent
Peters

(10) Patent No.: US 7,503,009 B2
(45) Date of Patent: Mar. 10, 2009

(54) MULTIFUNCTIONAL ICON IN ICON-DRIVEN COMPUTER SYSTEM

(75) Inventor: Johan C. Peters, Baden-Wuerttemberg (DE)

(73) Assignee: SAP AG, Walldorf (DE)

( * ) Notice: Subject to any disclaimer, the term of this patent is extended or adjusted under 35 U.S.C. 154(b) by 271 days.

(21) Appl. No.: 11/319,522

(22) Filed: Dec. 29, 2005

(65) Prior Publication Data

US 2007/0157097 A1  Jul. 5, 2007

(51) Int. Cl.
G06F 3/048 (2006.01)
(52) U.S. Cl. .................. 715/764; 715/810; 715/835; 715/837
(58) Field of Classification Search .......... 715/764, 715/810, 835, 837
See application file for complete search history.

(56) References Cited

U.S. PATENT DOCUMENTS

| | | | | |
|---|---|---|---|---|
| 4,658,351 | A * | 4/1987 | Teng | 718/103 |
| 4,899,136 | A * | 2/1990 | Beard et al. | 345/156 |
| 5,317,687 | A * | 5/1994 | Torres | 715/823 |
| 5,491,784 | A * | 2/1996 | Douglas et al. | 715/810 |
| 5,491,795 | A * | 2/1996 | Beaudet et al. | 715/804 |
| 5,525,978 | A * | 6/1996 | York et al. | 341/22 |
| 5,737,561 | A * | 4/1998 | Dulong | 712/215 |
| 5,760,774 | A * | 6/1998 | Grossman et al. | 715/835 |
| 5,784,061 | A * | 7/1998 | Moran et al. | 715/863 |
| 5,818,444 | A * | 10/1998 | Alimpich et al. | 715/765 |
| 6,002,402 | A * | 12/1999 | Schacher | 715/810 |
| 6,145,031 | A * | 11/2000 | Mastie et al. | 710/52 |
| 6,208,344 | B1 * | 3/2001 | Holzman et al. | 715/846 |
| 6,295,062 | B1 * | 9/2001 | Tada et al. | 715/835 |
| 6,469,722 | B1 * | 10/2002 | Kinoe et al. | 715/837 |
| 6,697,090 | B1 * | 2/2004 | Nagasaka et al. | 715/769 |
| 6,857,105 | B1 * | 2/2005 | Fox et al. | 715/825 |
| 6,948,126 | B2 * | 9/2005 | Malamud et al. | 715/715 |
| 7,086,011 | B2 * | 8/2006 | Budrys et al. | 715/837 |
| 2002/0055955 | A1 * | 5/2002 | Lloyd-Jones et al. | 707/512 |
| 2003/0169294 | A1 * | 9/2003 | Vatula et al. | 345/764 |

(Continued)

FOREIGN PATENT DOCUMENTS

CA  2298437 A1 * 9/2000

(Continued)

OTHER PUBLICATIONS

"Direct Access to Contained Objects via Pop-up (Context Menus)", by James et al., IBM TDB, Published Dec. 1, 1993, pp. i, 167, 168.*

(Continued)

Primary Examiner—Rachna S Desai
Assistant Examiner—Gregory A Distefano
(74) Attorney, Agent, or Firm—Kenyon & Kenyon LLP

(57) ABSTRACT

An icon-driven computer system collects a plurality of data files under a common graphical icon. Commands entered into the computer system with respect to the icon may be interpreted as a command to repeat the same action on each of the data files linked to the icon. Related commands provide for simple maintenance of the grouped icon—by adding files to or removing files from the icon—and selection of one data file from within the group for special treatment. In this regard, the grouped icon represents a selection of multiple data files wherein the selection has persistence and may be revised over time.

34 Claims, 4 Drawing Sheets

U.S. PATENT DOCUMENTS

2004/0204949 A1* 10/2004 Shaji et al. .................. 705/1
2005/0060354 A1* 3/2005 Keohane et al. ............ 707/200
2005/0125736 A1* 6/2005 Ferri et al. ................. 715/747
2005/0273729 A1* 12/2005 Kumashio ................... 715/825
2006/0101347 A1* 5/2006 Runov et al. ............... 715/764

FOREIGN PATENT DOCUMENTS

EP 816999 A2 * 1/1998
JP 08030426 A * 2/1996

OTHER PUBLICATIONS

"Showing contents of a folder and opening of folder/file via context menu", by IBM, Published Nov. 29, 2005 by www.ip.com, pp. i, 1, 2.*

"Microsoft Windows XP Professional, Administrator's Guide", by Jerry Lee Ford, Published by Coarse PTR in 2003, pp. i, iv, 243, 269.*

"Microsoft Windows XP fast & easy", by Diane Koers, Published by Premier Press in 2002, pp. i, ii, 37, 119, 120, 125, 130, 150, 152, 264, 265.*

* cited by examiner

300

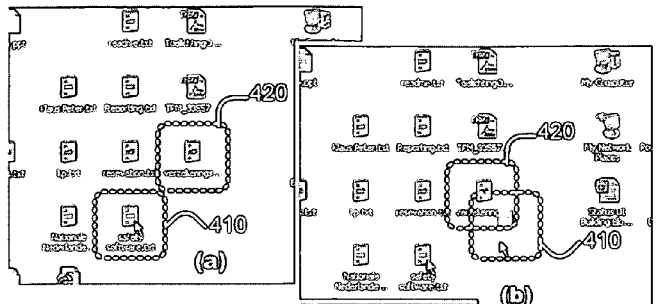
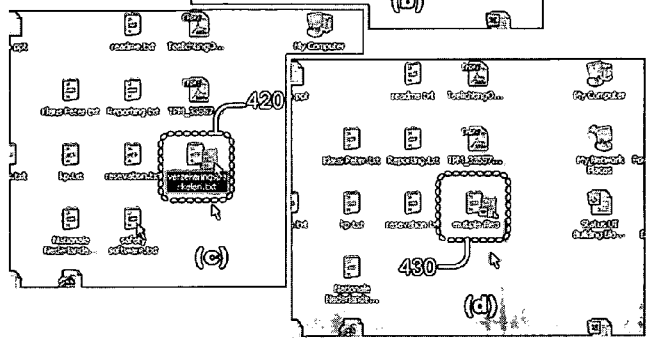
FIG. 4
400
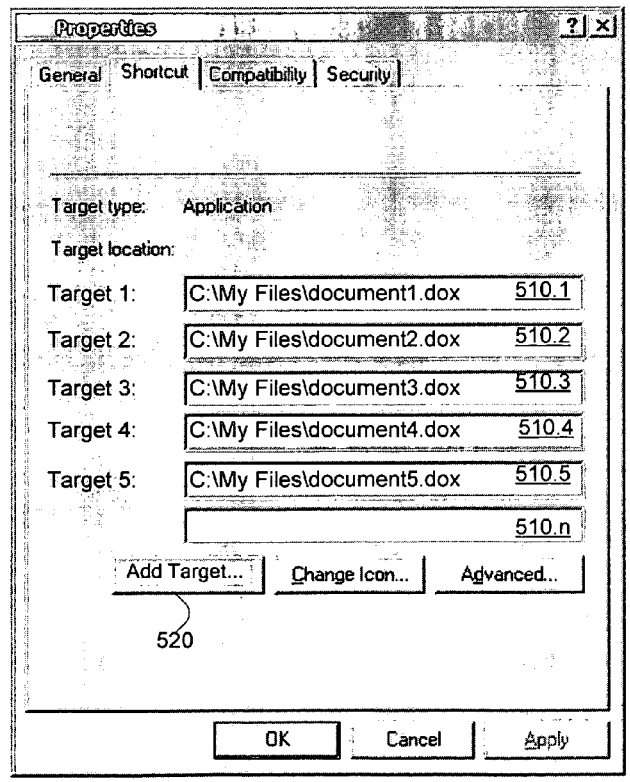
FIG. 5
500

MULTIFUNCTIONAL ICON IN ICON-DRIVEN COMPUTER SYSTEM

BACKGROUND

Graphical user interfaces (GUIs) are ubiquitous tools of modern computer systems. They typically include various graphical controls to permit operators to enter commands, interact with program applications and manipulate data files.

In common graphical user interface, a computer system displays various workspaces to a user populated with icons ti represent applications, documents, spreadsheets, presentations and other operator work products. Icon driven GUIs are convenient tools for system operations because they permit the operator to interact with data files in an intuitive manner— the operator might open a data file, for example, by pointing and clicking on the corresponding icon. Thus, the icons represent a convenient scheme for interacting with data files on an individual basis.

Icon-based GUIs are less convenient tools, however, when an operator needs to execute a common command upon a large collection of icons. Icons may be scattered spatially across a single workspace or, sometimes, multiple workspaces (for example, multiple folder locations in a file system). While some operating systems permit an operator to perform a multiple selection upon several icons (for example, by holding a CTRL button and selecting individual icons), the operator's selection has no persistence. If the operator releases the CTRL button and clicks on another icon, the prior multiple icon selection is discarded. If the operator selects an icon in error, the operator must repeat the entire multiple icon selection process from scratch. Thus, these icon-based GUIs can be administratively expensive to use because operators primarily interact with icons on an individual basis.

There is a need in the art for a GUI in a computer system that maintains a persistent selection of multiple data files therein. There is a further need in the art for such a system that provides a simple mechanism for maintaining and revising such selections and for entering common commands that are to be executed upon all the data files subsumed within such a selection.

BRIEF DESCRIPTION OF THE DRAWINGS

FIG. 4 includes a sequence of screen shots illustrating creation of a grouped icon via a drag and drop process according to an embodiment of the present invention.

FIG. 5 illustrates a properties record of a grouped icon according to an embodiment of the present invention.

DETAILED DESCRIPTION

Embodiments of the present invention provide a "grouped icon "for use in an icon-driven computer system. According to these embodiments, a graphical user interface (GUI) of the computer system permits an operator ti aggregate multiple data files stored by the computer system under a single icon. Commands entered into the computer system with respect to the icon may be interpreted as a command ti repeat the same action in each of the data files linked to the icon. Embodiments of the invention also provide for dimple maintenance of the grouped icon—by adding files to or removing files from the icon—and a mechanism to select one data file from the group for special treatment. In this regard, the grouped icon represents a selection of multiple data files wherein the selection has persistence and may be revised over time.

Figure 1:
FIG. 1 is an exemplary screen shot of a plurality of icons to be grouped into a common icon according to an embodiment of the present invention.

FIG. 1 is a screen shot of a GUI according to an embodiment of the present invention. The GUI illustrates a workspace 100 maintained by the computer system, which can be a user's desktop workspace or a workspace of a file system as may be convenient. As illustrated, the workspace 100 may include several icons 110 representing among other things data files, folders, applications and/or system entities (printers or other services) that are supported by the computer system. The data files typically can include text files, documents (word processing or other kinds of documents), spreadsheets, presentation files, ZIP files, web pages, e-mails and the like. For the purposes of the present discussion, the term "data file" extends to any work product (or reference to a work product, like a link or short cut) that may be created by an operator of a computer system and stored for later use. Data files are readily distinguishable from applications, which represent processes that the computer system may execute, and from administrative data that the computer system may use to maintain the system itself.

Figure 2:
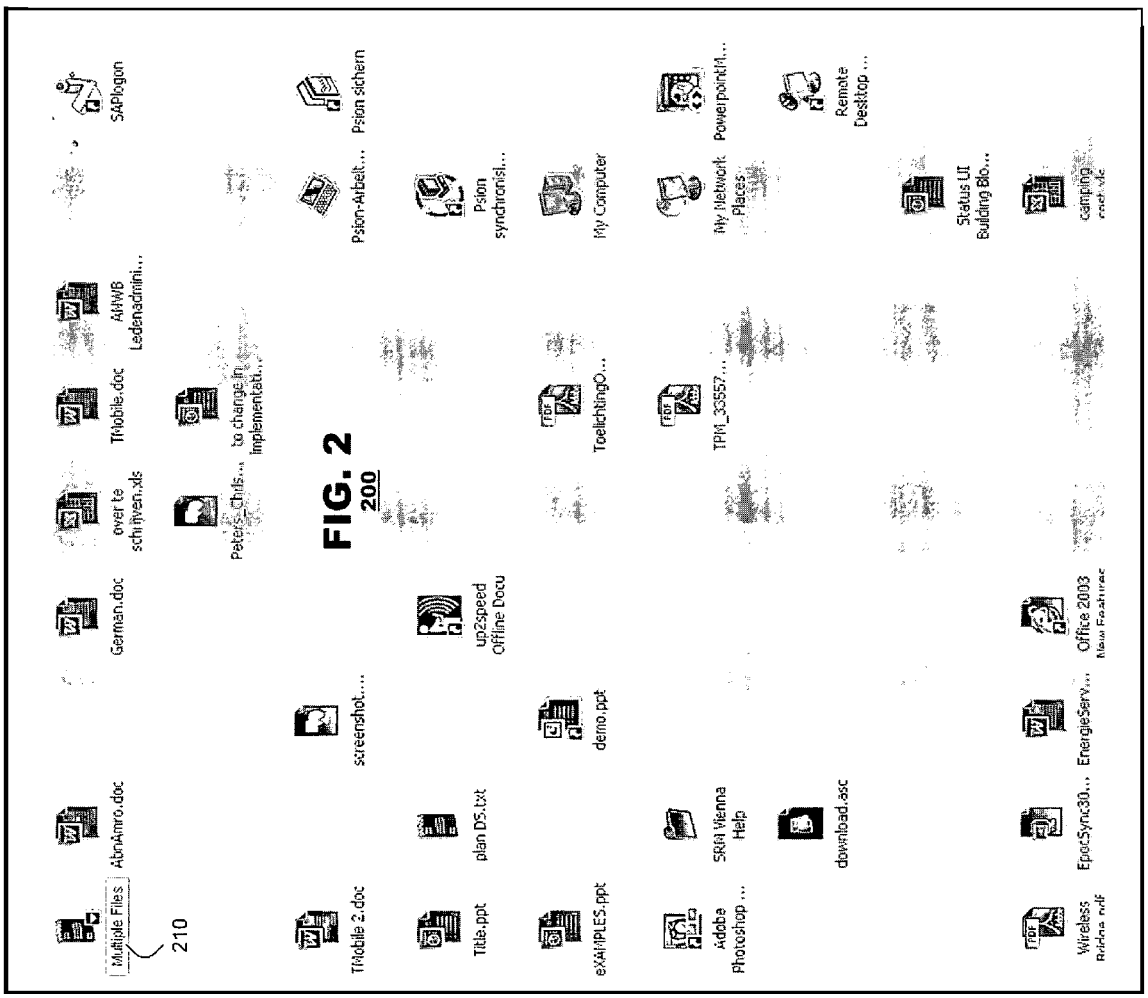
FIG. 2 is a screen shot illustrating an exemplary grouped icon generated from the selected icons of FIG. 1.

Embodiments of the present invention employ a single icon to represent several data files stored in a file system. To build the icon, an operator may select multiple data files from the workspace and enter an appropriate command to the computer system to group the files. In the example of FIG. 1, selected icons are shown as highlighted in the illustration. In this example, an operator may enter "group" command 120 that the computer system interprets to replace the selected data files with a single common icon. In the example of FIG. 1, the group command is included in a context menu 130 that may be opened by right-clicking upon one of the selected icons. The group command also may be included in a pull down or pull up menu or it may be entered by keyboard command or mouse gesture. FIG. 2 illustrates the workspace 100 of FIG. 1 with the group icon 210.

Having collected a number of data files under the rubric of a common workspace icon 210, the computer system permits operators to interact with the icon according to conventional processes. For example, the icon may be cut and pasted among various workspaces (from a folder to a user's desktop or vice versa). The icon may be sent to other users via e-mail or other file exchange.

The group icon also permits enhancements that are not afforded convention, single item icons in conventional icon-driven interfaces. For example, a print command entered with respect to the icon may be interpreted by the computer system as a command to open and print all data files that are linked to the icon. An edit command may cause the computer system to open all data files that are linked to the icon in appropriate editing applications corresponding thereto—for example, word processing documents would be opened in a word processor, spreadsheets would be open in a spreadsheet program, etc. Other commands such as "send to," "convert to" or "zip" would cause corresponding operations to be executed on each of the data files linked to the group icon.

Many modern computer systems support context-specific menus for data files of various types and the icons that are used to represent them. Again, operators commonly open context-specific menus by entering a command to the computer system via a mouse (typically, right clicking on the mouse). According to an embodiment of the present invention, context-specific menus also may be used in connection with a group icon.

Figure 3:
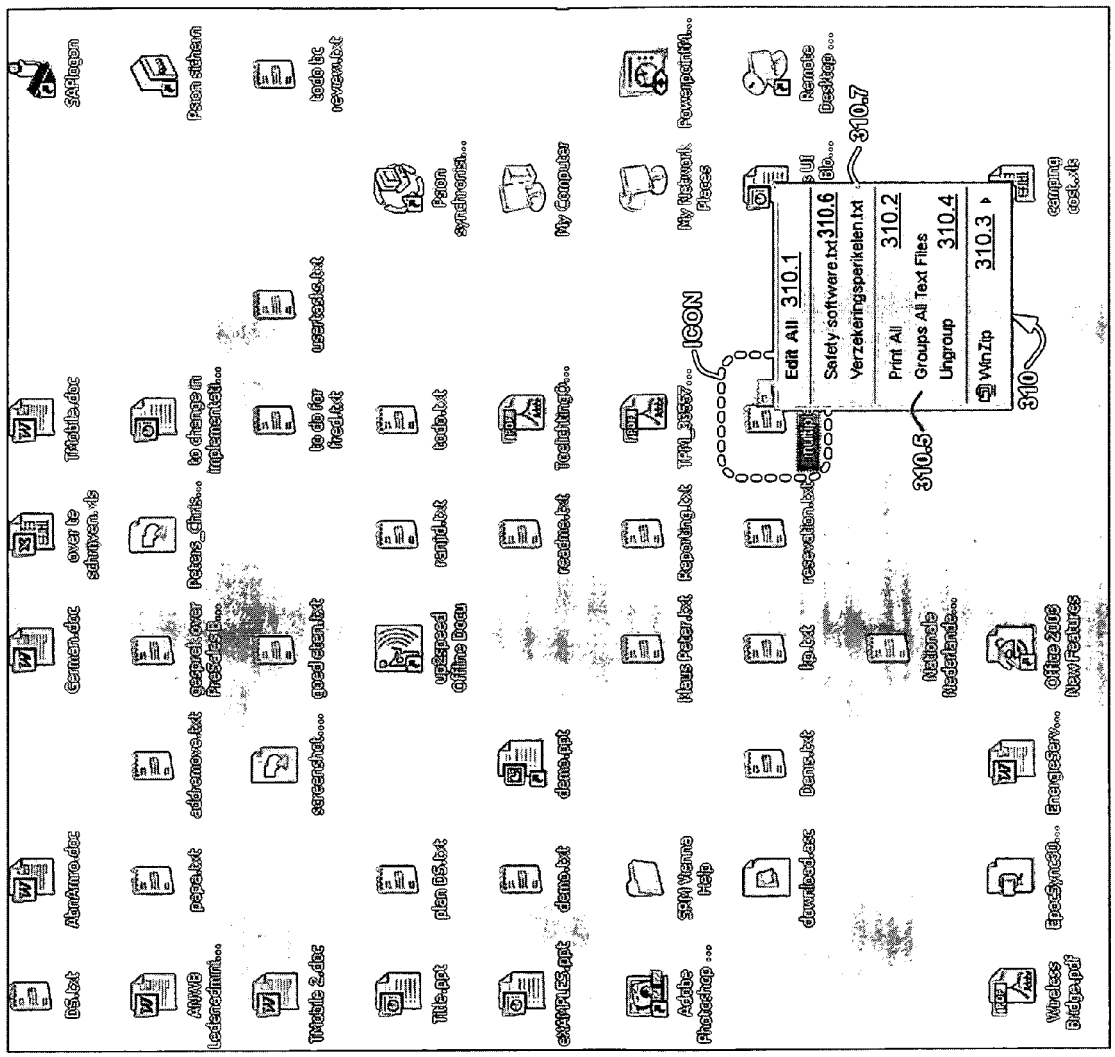
FIG. 3 is a screen shot illustrating an exemplary context menu supporting a grouped icon according to an embodiment of the present invention.

An exemplary context menu 310 is shown in FIG. 3. There, the menu 310 illustrates a first set of commands 310.1-310.3 that, if selected, would cause the corresponding functionality to be performed on all data files linked to the icon. In the example of FIG. 3, the commands permit the operator to open all the data files ("edit all"), to print all the data files ("print") and perform collection and data compression on all the data files ("winzip"). Other commands may be added to this set as desired, for example, a command to send the files to other users via e-mail, to delete the files, to copy the files to another location on the file system or to scan the files for viruses (commands not shown). The menu 310 also includes a second set of command entries 310.4-310.5 to maintain the group icon itself, such as the "ungroup" command 310.4 and the "group all text files" command 310.5 illustrated in FIG. 3. The context menu includes a third set of command entries that relate to individual members of the files contained within the group. In the example of FIG. 3, two files are shown—safety software.txt 310.6 and verzekeringsperikelen.txt 310.7. Selection of one of these command entries opens an individual file from within the group for editing or review. Thus, the context menu 310 provides a mechanism through which operators may perform a common operation on all files grouped together under the icon but also in which operators may select individual members of the group for editing.

In another embodiment, not shown, the context menu 310 may be provided as a nested menu in which interaction with one of the files listed therein causes another context menu to open. The second context menu may illustrate commands or operations that may be entered with respect to the one application.

FIGS. 4(a)-(d) illustrate a technique for building a grouped icon via a drag-and-drop operation according to an embodiment of the present invention. In this example, an operator decides to group two icons 410, 420. An operator may do so by selecting a source icon (say, icon 410) and dragging it until it is superimposed over a second icon 420, called a "target icon" herein. The operator may release the source icon 410 while over the target icon 420. This action is represented in FIGS. 4(a)-(c). In doing so, the computer system may interpret the operator's command as a command to group the two icons together. The computer system may replace the source and target icons 410, 420 as a group icon 430 (FIG. 4(d)). The group icon 430 may be given a generic name by default as shown in FIG. 4(d). Alternatively, the group icon 430 may be assigned a name that represents a concatenation of names of the source and target icon or it may be assigned a name that represents any text the source and target icons 410, 420 may have had in common.

Additional source icons 410 may be added to the group icon 430 via the same drag and drop operation (not shown in FIG. 4).

FIG. 5 illustrates an exemplary properties data structure for a group icon. As illustrated, the group icon is supported by a properties record that identifies, for each data file collected within the group icon, a location in a file system where the data file may be found. In the example of FIG. 5, target identifier fields 510.1-510.n list the locations expressly. The properties record, when displayed via the operating system, also may be supported by a GUI control 520 (the "add target" button) that permits operators to add data files manually.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A computer system comprising:
a display device;
a processor to execute program instructions and render a graphical user interface on the display device, displaying a workspace of the computer system,
the workspace including a group icon, the group icon representing a persistent selection of each of a plurality of data files the group icon associated with a property record listing a plurality of target fields corresponding to each of the plurality of data files, wherein when the group icon is acted upon by an operator command, the graphical user interface presents a context menu displaying available commands, and wherein upon selection of one available command, the computer system executes the one command upon all data files listed in the plurality of target fields.

2. The computer system of claim 1, wherein the graphical user interface includes a context menu associated with the group icon that, when displayed, displays names of a plurality of the data files associated therewith.

3. The computer system of claim 2, wherein the context menu displays all of the data files associated with the group icon.

4. The computer system of claim 2, wherein the context menu displays a subset of the data files associated with the group icon.

5. The computer system of claim 1, wherein the context menu displays a list of commands that may be executed upon all data files associated with the group icon.

6. The computer system of claim 1, wherein the command includes compressing data contained in all the data files associated with the group icon.

7. The computer system of claim 1, wherein the command includes printing data contained in all the data files associated with the group icon.

8. The computer system of claim 1, wherein the command includes deleting data contained in all the data files associated with the group icon.

9. The computer system of claim 1, wherein the command includes a copy/paste operation performed on data contained in all the data files associated with the group icon.

10. The computer system of claim 1, wherein the command includes scanning the data files associated with the group icon for viruses.

11. The computer system of claim 1, wherein the graphical user interface further includes a displayable properties record of the group icon that, when displayed, lists file system locations of all data files associated with the group icon.

12. The computer system of claim 1, wherein the system stores a properties record data structure for the group icon respectively storing a path name to a plurality of individual locations in file storage where each associated data file is stored, wherein the computer system executes the one command on the more than one data files.

13. The computer system of claim 1, wherein the command is executed on each of the plurality of data files associated with the group icon based on the associated data files order in a properties record data structure.

14. The computer system of claim 1, wherein the processor interprets the selected command to include a command to open each of the plurality of data files in the group icon and executes the one selected command upon all of the open data files associated with the group icon.

15. The computer system of claim 1, the processor executing instructions to present in the context menu of the graphical user interface a first list of commands executable on all of the persistently selected data files and a second list of commands executable on individual persistently selected data files in the group icon.

16. A method of creating a group icon, comprising:
responsive to an operator command entered via a graphical user interface that drags and drops a source icon containing at least one data file upon a target icon containing at least one data file,
replacing both the source and the target icons in the graphical user interface with a group icon, wherein the group icon is assigned a name different from the source icon and the target icon,
associating all of the data files in the group icon with one another, wherein the associating includes selecting all data files in the group icon, wherein the selection has persistence and allows for operations to be performed on data contained in all of the data files in the group icon by selection of a single operation,
generating a properties record including for each of the data files in the group icon data representing locations of data files formerly represented by the source and target icons.

17. A method of establishing a group icon and executing a command upon a plurality of data files in a computer system associated with the group icon, comprising:
presenting, via a graphical user interface, a properties record control for a group icon that identifies a plurality of individual target fields identifying specific locations in a file system of each of a plurality of data files associated with the group icon, wherein each of the locations is an arbitrary location of the data file in a-the file system, wherein the files identified in the property record are persistently selected and the group icon containing all of the persistently selected files is displayed in a graphical user interface;
responsive to a command entered via the graphical user interface upon the group icon displayed therein, the group icon identifying a plurality of persistently selected data files grouped under the group icon, and
executing the entered command upon data within all of the data files ~/-grouped under the group icon.

18. The method of claim 17, wherein the command includes opening all the data files associated with the group icon using applications associated with each of the data files and the data contained in each of the data files is presented on a display device.

19. The method of claim 17, wherein the command includes compressing the data within all the data files associated with the group icon.

20. The method of claim 17, wherein the command includes printing the data contained in all the data files associated with the group icon.

21. The method of claim 17, wherein the command includes deleting the data contained in all the data files associated with the icon.

22. The method of claim 17, wherein the command includes a copy/paste operation performed on the data contained in all the data files associated with the icon.

23. The method of claim 17, wherein the command includes scanning the data files associated with the group icon for viruses.

24. The method of claim 17, further comprising, responsive to another command, displaying a context menu that displays names of the data files associated with the group icon.

25. The method of claim 17, further comprising, responsive to another command, displaying a context menu that displays commands that may be performed upon the data files associated with the group icon.

26. The method of claim 17, further comprising, responsive to another command, displaying a properties record that displays file system locations of the data files associated with the group icon.

27. The method of claim 17, further comprising:
in response to a command, displaying a context menu including a listing of files in the group icon and a list of commands that can be performed on all of the listed files by only selecting the command.

28. The method of claim 27, further comprising:
in response to selection of one of the files in the list of files, opening the individual file.

29. Computer readable medium having program instructions stored thereon that, when executed, causes a computer system to:
display group icons in a workspace via a graphical user interface, wherein a group icon represents a selection of each of multiple data files associated with the group icon, the group icon associated with a property record listing a plurality of target fields corresponding to each of the plurality of data files and the selection is persistent and capable of revision; and
when a command is entered upon one of the group icons, executing the command on the plurality of persistently selected data files listed in the plurality of target fields of the property record associated with the group icon, wherein the entered command is interpreted as a command to perform the same action on data in each of the multiple data files associated with the group icon.

30. The medium of claim 29, wherein the command includes opening all the data files using the appropriate application for each of the data files associated with the group icon and presenting the data on a display device.

31. The medium of claim 29, wherein the command includes compressing the data contained in all the data files associated with the icon.

32. The medium of claim 29, wherein the command includes printing the data contained in all the data files associated with the icon.

33. A computer system comprising:
a display device;
a processor to execute program instructions and render a graphical user interface on the display device, displaying a workspace of the computer system,
the workspace including a group icon, the group icon associated with a property record listing a plurality of target fields corresponding to a plurality of data files located at different locations of file storage, the group icon represents a persistent selection of the data files located at different locations of file storage, wherein when the group icon is acted upon by an operator command, the graphical user interface presents a context menu displaying available commands, and upon selection of one available command, the computer system executes the one command upon all of the persistently selected data files after opening applications corresponding to each of the persistently selected data files listed in the group icon.

34. A method of creating a group icon, comprising:
responsive to an operator command entered via a graphical user interface that drags and drops a source icon containing at least one data file upon a target icon containing at least one data file, replacing both the source and the target icons in the graphical user interface with a group icon, wherein the group icon is assigned a name different from the source icon and the target icon, associating all of the data files in the group icon with one another, wherein the associating includes selecting all data files in the group icon, wherein the selection has persistence and allows for operations to be performed on data contained in all of the data files in the group icon by selection of a single operation, generating a property record listing a plurality of target fields corresponding to each of the plurality of data files formerly represented by the source and target icons, wherein when the group icon is acted upon by an operator command, the graphical user interface presents a context menu displaying available commands, and wherein upon selection of one available command, the computer system executes the one command upon all data files listed in the plurality of target fields.

* * * * *